(No Model.) 3 Sheets—Sheet 1.

T. CLANCEY.
VALVE.

No. 307,525. Patented Nov. 4, 1884.

Witnesses:
W. H. Jones
A. B. Fairchild

Inventor:
Thomas Clancey
By atty
A. Wooster (No Model.) 3 Sheets—Sheet 2.

T. CLANCEY.
VALVE.

No. 307,525. Patented Nov. 4, 1884.

Witnesses.

Inventor
Thomas Clancey
By atty (No Model.) 3 Sheets—Sheet 3.

T. CLANCEY.
VALVE.

No. 307,525. Patented Nov. 4, 1884.

Witnesses
W. H. Jones
A. B. Fairchild

Inventor
Thomas Clancey
By A. M. Wooster
Atty

UNITED STATES PATENT OFFICE.

THOMAS CLANCEY, OF BRIDGEPORT, CONNECTICUT.

VALVE.

SPECIFICATION forming part of Letters Patent No. 307,525, dated November 4, 1884.

Application filed January 31, 1884. (No model.)

*To all whom it may concern:*

Be it known that I, THOMAS CLANCEY, a citizen of the United States, residing at Bridgeport, in the county of Fairfield and State of Connecticut, have invented certain new and useful Improvements in Valves; and I do hereby declare the following to be a full, clear, and exact description of the invention, such as will enable others skilled in the art to which it appertains to make and use the same.

My invention relates to that class known as "gate-valves," and has for its object to simplify their mode of operation. With this end in view I have devised a novel construction, which I will now proceed to describe, reference being made to the accompanying drawings, forming part of this specification, in which—

Figure 1:
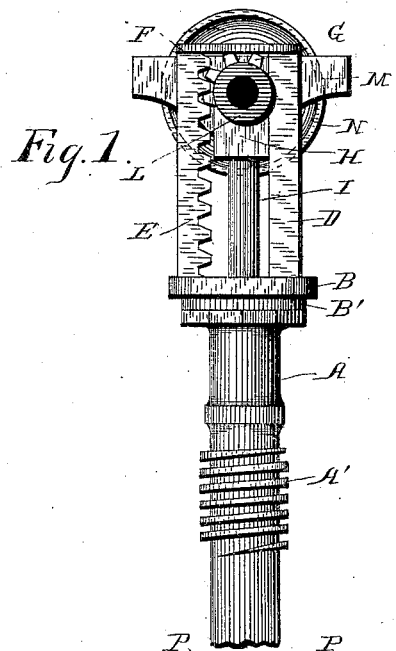
Figure 2:
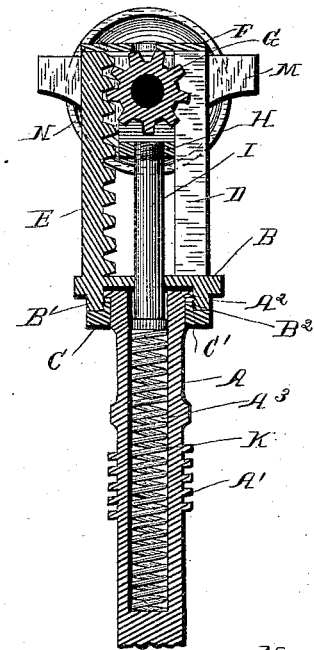
Figure 3:
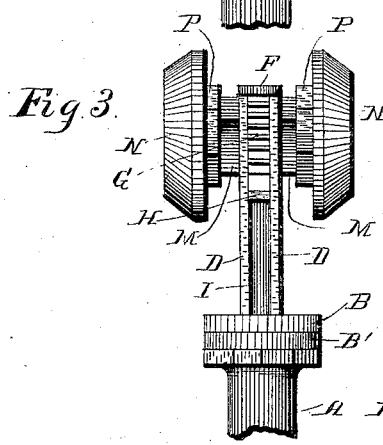
Figure 4:
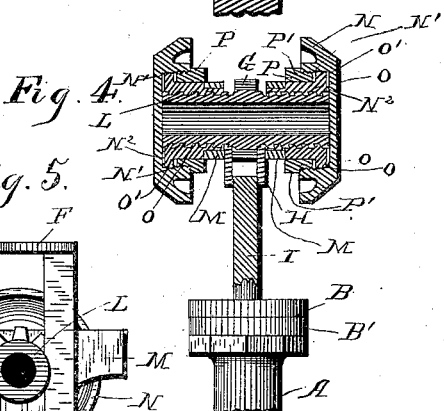
Figure 5:
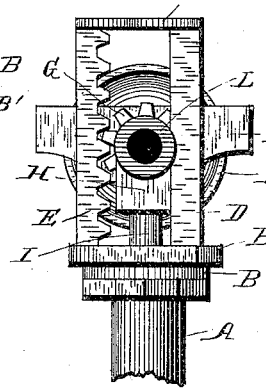
Figure 6:
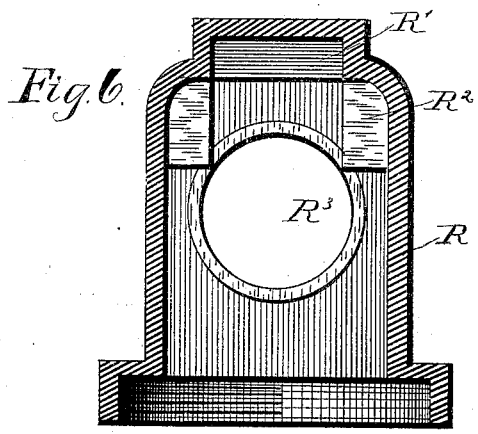
Figure 7:
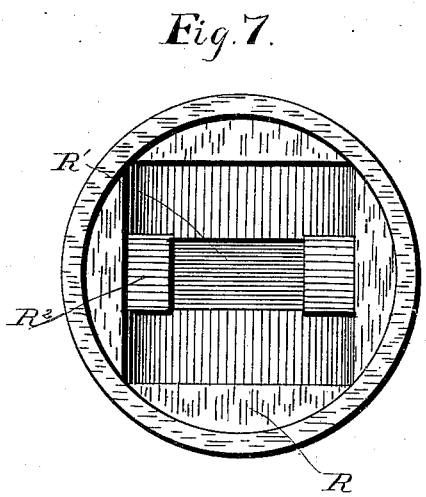
Figures 8, 9, 10:
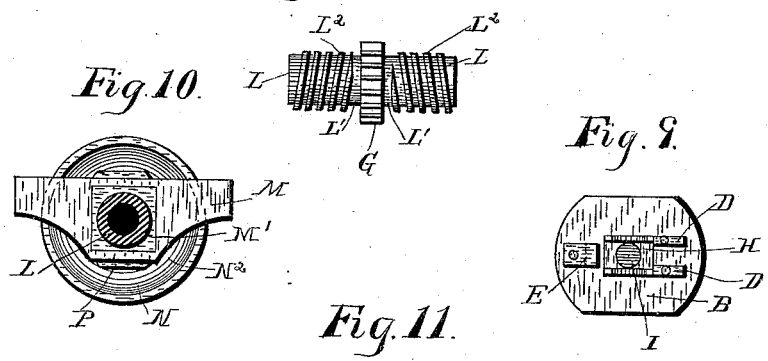
Figure 11:
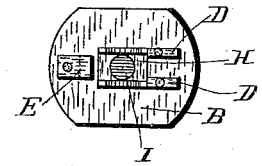
Figure 12:
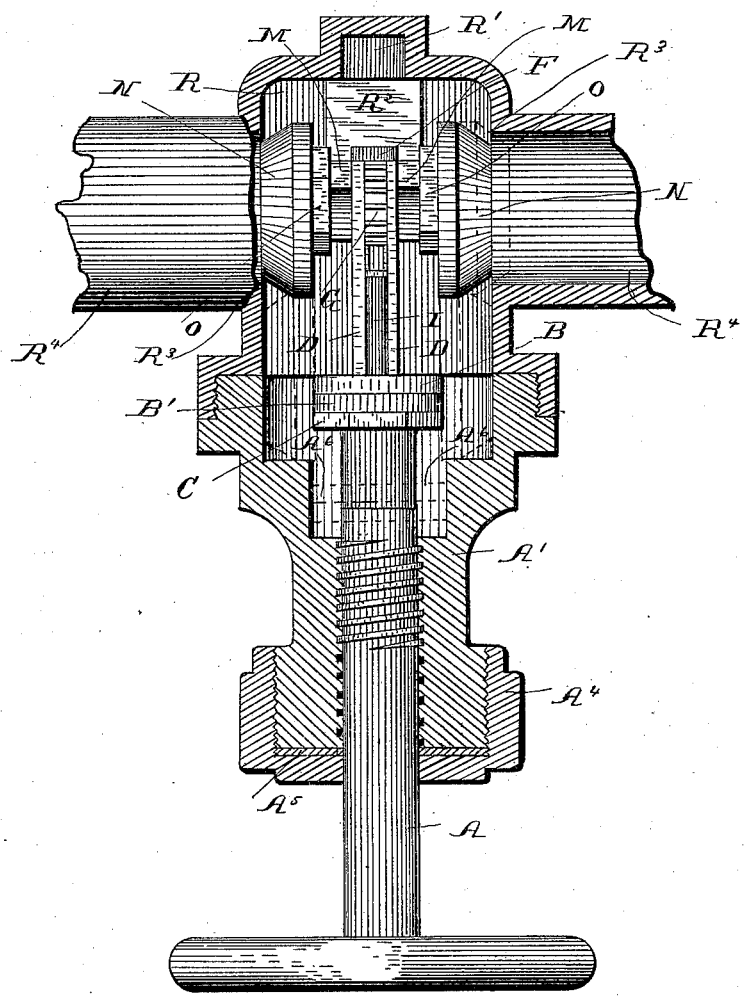

Figure 1 is an end elevation of the internal mechanism, one of the disks being removed. Fig. 2 is a central longitudinal section of the same. Fig. 3 is a side elevation, and Fig. 4 a central section of the same, the side pieces being removed. Fig. 5 is a view similar to Fig. 1, but showing the position of the parts when the valve is closed. Fig. 6 is a section of the casing; Fig. 7, a plan view of the same; Fig. 8, a detail of the right and left threaded operating-shaft. Fig. 9 is a plan view of the frame with the top plate removed; Fig. 10, an inside elevation of the disk and arm, with the shaft in section; Fig. 11, details in section of the disk and nuts; and Fig. 12 is a section of the casing on a vertical plane transverse to the plane of Fig. 6, showing the internal mechanism in elevation within the casing, and also showing a hand-wheel for operating the same.

Similar letters indicate like parts in all the figures.

A is the stem, having a thread which engages a corresponding internal thread in the casting A'.

$A^2$ is a flange at the head of the stem; $A^3$, a pocket in the interior of the stem, and $A^4$ a cap which is screwed on the head of casting A'. This cap is provided with an opening, through which the stem passes, and preferably has a packing-washer, $A^5$, at the bottom thereof.

$A^6$ is a recess in casting A', upon the bottom of which the nut upon the stem rests when the valve is fully open, the bottom of the recess serving as a stop.

B is a plate having a depending flange, B', internally screw-threaded, as at $B^2$. Flange B' projects over flange $A^2$ on the stem, and the two parts are detachably secured together by a nut, C, having a flange with an external screw-thread, as at C'. This thread engages with thread $B^2$ upon the plate. It will be observed that the flange upon the nut does not bear against the flange upon the stem, thus leaving plate B swiveled to the head of the stem.

D D are side pieces integral with and projecting upward from plate B, and E is a rack, also integral with and projecting upward from the plate, for a purpose to be more fully explained.

F is a top plate, to which the rack and side pieces are secured, and which acts to hold said parts firmly together.

G is a pinion made in one piece with operating-shaft L. This shaft is provided with bearings L', which rest in yoke H, and with right and left screw-threads $L^2$, as will be more fully explained.

I is a rod, to the upper end of which yoke H is attached. This rod runs downward, passes through an aperture in plate B, and into a pocket, $A^3$, in the interior of the stem.

K is a coiled spring resting at the bottom of the pocket, and bearing against rod I, which, with the pinion and yoke, it acts to force upward.

M M are arms having angular apertures M', engaging with the angular portions $O^2$ of the nuts O. The ends of these arms bear against lugs $R^2$ in the case, as will be more fully explained.

N N are the disks, having internal screw-threads, as at N'. Nuts O O are provided, respectively, with right and left internal screw-threads, which are engaged by the corresponding right and left threads upon the operating-shaft L. At the outer ends of nut O are flanges O', which rest in the recesses $N^2$ in the backs of the disks.

P P are nuts, which fit loosely over the round portions O³ of nuts O. Nuts P are provided with angular flanges for convenience in operating them, and with external screw-threads, P², which engage with threads N' in the disks. These parts are assembled as follows: Nuts O are placed in the disks with the flanges O' at the bottom of recesses N². Nuts P are then placed over nuts O, when threads P² upon the nuts will engage threads N' in the recess in the disk. It will be observed that when nut P is screwed up tight against the disk the threaded portion of the nut does not quite touch the flange upon nut O, (see Fig. 4,) which leaves the disk swiveled upon nut O. When nut P is tightened up, the nut and disk move as one piece, nut P being journaled upon the round portion of nut O, thus leaving the disk free to turn. Nut O is held against rotation by the engagement of its angular portion with the apertures in the arms, so that when the parts are assembled and the right and left threads upon the operating-shaft in engagement with the corresponding threads in nuts O rotation of the operating-shaft will impart equal motion to the two disks, but in opposite directions.

R is the valve-case, which is provided with a well or pocket, R', which accommodates plate F and the upper ends of the side pieces and rack when the disks are pressed against the seats.

R² are lugs cast upon the inside of the case, against which the arms M bear when it is desired to close the valve.

R³ represents one of the seats against which the beveled portions of the disks rest when the valve is closed.

The operation is as follows: The action of spring K is to hold the valve open—that is to say, the disks are not against the seats. The disks are shown in the open position in Figs. 1, 2, 3, and 4. When it is desired to close the valve, the stem is rotated by the hand-wheel to carry it upward against the action of spring K, which bears against rod I. Arms N bear upon lugs R² in the case, thus preventing the operating-shaft from being carried upward. As the movement of the stem, however, carries the plates, rack, and side pieces, it follows that the rack must impart rotation to the pinion which engages it. Thus by means of the right and left threads upon the operating-shaft, which engage in corresponding threads in nuts O, the disks are rapidly moved outward and against the seats.

The position of the rack, pinion, side pieces, and frame when the disks are forced against the seats is clearly illustrated in Fig. 5, in which position the top plate, F, would have passed into the well or pocket R', which is shown in Fig. 6.

To open the valve the stem is rotated in the opposite direction, the first action of which is to carry the disks to the position shown in full lines in Fig. 12, the closed position of the disks being shown in dotted lines. The continued rotation of the stem in the opposite direction acts to draw the entire internal mechanism of the valve downward until nut C rests upon the bottom of recess A⁶ in casting A', thus leaving a straight way through the valve-case between the pipes R⁴. The position of the disks when the valve is open is also indicated in dotted lines.

It will of course be understood that the relative position of the parts is not of the essence of my invention, as the valve may be operated from above as well as from below.

I do not desire to limit myself to the exact details of construction shown, as they may manifestly be varied within reasonable limits without departing from the spirit of my invention.

Having thus described my invention, I claim—

1. The combination, with a valve-case, disks, and a shaft having right and left screw-threads and a pinion, of arms M, which engage the case, a rack which engages the pinion, and mechanism for actuating the rack.

2. In a valve, a stem having a pocket containing a spring, and a rod resting on the spring and carrying a yoke, in combination with a shaft bearing in the yoke, and provided with right and left threads and a pinion, disks actuated by the threads, and means for rotating the pinion.

3. The stem, a plate swiveled thereto, a rack, and side pieces secured to the plate and held by a top plate, in combination with a spring-actuated rod carrying a shaft with right and left threads, and a pinion engaging the rack whereby the valve-disks are operated.

4. The case having lugs, and the stem carrying a rack and spring-actuated rod, in combination with the right and left threaded pinion-shaft, nuts O P, and arms M, for the purpose set forth.

5. A valve-casing having well or pocket R', seats R³, and lugs R², in combination with arms M, the disks, and operating mechanism.

6. The combination, with the casing having well R' and lugs R², of a shaft carrying a pinion, and threaded, as shown, to actuate the disks, and nut O, having angular portion for engaging arms M, which bear against the lugs, as described, and for the purpose set forth.

7. The case having lugs, and the shaft having right and left threads, and carrying a pinion, in combination with nuts O, which engage the threads, and have angular portions which carry arms M, the disks swiveled to nuts O, and means for operating the pinion.

8. The case, the disks having recesses, as shown, and internal screw-threads, and nuts O, having flanges O', angular portion O², and round portion O³, in combination with nuts P, which pass over the round portion of nuts O, and have external screw-threads which engage the threads on the disks, arms M, carried by the angular portions, and means for moving nuts O in either direction.

9. A valve-case, the yoke, rod, stem, and spring, in combination with the rack, side pieces, plates B and F, pinion, right and left threaded shaft, arms, and the disks, all combined and arranged as described, and for the purpose set forth.

In testimony whereof I affix my signature in presence of two witnesses.

THOMAS CLANCEY.

Witnesses:
A. M. WOOSTER,
RICHARD A. CLANCEY.